US007007064B2

(12) United States Patent
Faris (10) Patent No.: US 7,007,064 B2
(45) Date of Patent: Feb. 28, 2006

(54) METHOD AND APPARATUS FOR OBTAINING AND MANAGING WIRELESSLY COMMUNICATED CONTENT

(75) Inventor: Randi W. Faris, Boca Raton, FL (US)

(73) Assignee: Motorola, Inc., Schaumberg, IL (US)

( * ) Notice: Subject to any disclaimer, the term of this patent is extended or adjusted under 35 U.S.C. 154(b) by 513 days.

(21) Appl. No.: 10/211,614

(22) Filed: Aug. 2, 2002

(65) Prior Publication Data

US 2004/0021555 A1 Feb. 5, 2004

(51) Int. Cl.
*G06F 15/16* (2006.01)
(52) U.S. Cl. ............... 709/203; 709/202; 709/216; 709/27; 709/231; 455/420
(58) Field of Classification Search ............... 709/231, 709/201–203, 216–219, 225–229; 455/412.1–412.2, 455/418–420, 456.5–456.6
See application file for complete search history.

(56) References Cited

U.S. PATENT DOCUMENTS

| 5,504,476 | A | | 4/1996 | Marrs et al. |
| 5,561,802 | A | * | 10/1996 | Orimo et al. ............... 709/202 |
| 5,705,995 | A | | 1/1998 | Laflin et al. |
| 5,991,800 | A | | 11/1999 | Burke et al. |
| 6,064,975 | A | * | 5/2000 | Moon et al. ............... 705/8 |
| 6,202,023 | B1 | * | 3/2001 | Hancock et al. ............ 701/201 |
| 6,260,059 | B1 | * | 7/2001 | Ueno et al. ................. 709/202 |
| 6,295,502 | B1 | * | 9/2001 | Hancock et al. ............ 701/201 |
| 6,363,419 | B1 | * | 3/2002 | Martin, Jr. et al. ......... 709/219 |
| 6,397,259 | B1 | * | 5/2002 | Lincke et al. ............... 709/236 |
| 6,470,381 | B1 | * | 10/2002 | De Boor et al. ............ 709/217 |
| 6,526,284 | B1 | * | 2/2003 | Sharp et al. ............. 455/456.6 |
| 6,731,612 | B1 | * | 5/2004 | Koss ......................... 370/310 |
| 6,775,291 | B1 | * | 8/2004 | Ryu et al. ................... 370/401 |
| 6,795,827 | B1 | * | 9/2004 | Ohira ........................ 709/201 |
| 6,823,373 | B1 | * | 11/2004 | Pancha et al. ............. 709/219 |
| 6,826,614 | B1 | * | 11/2004 | Hanmann et al. ........... 709/227 |

* cited by examiner

*Primary Examiner*—Bharat Barot
(74) *Attorney, Agent, or Firm*—Randi L. Karpinin; Daniel C. Crilly (57) ABSTRACT

A wireless communication device (60) for receiving communicated content includes a receiver (125), a processor (140), a content memory (180), and a content management application (165). The receiver (125) receives a content message (260) from a wireless communication system (10). The content message (260) includes a document type (265), wherein the document type indicates that the content message (260) includes data relating to one or more communicated content portions (280). The content management application (165) processes the data relating to the one or more communicated content portions (280) and stores the data relating to the one or more communicated content portions (280) in the content memory (180).

26 Claims, 6 Drawing Sheets

METHOD AND APPARATUS FOR OBTAINING AND MANAGING WIRELESSLY COMMUNICATED CONTENT

BACKGROUND OF THE INVENTION

1. Field of the Invention

This invention relates in general to communication systems and in particular to wireless communication systems for providing content to wireless communication devices.

2. Description of the Related Art

Historically, wireless communication devices, such as cellular telephones and two way messaging devices, have had the ability to receive data and/or voice messages sent from a wireless communication system, and perform standard functions in response to message receipt such as storing the message, displaying the message, or alerting the user of receipt of the message. Data messages are typically a numeric message such as a phone number, or an alphanumeric message containing one unique piece of information such as "meeting in my office at 6:00 pm."

The user is alerted of receipt of a new message by an audible alert or a vibratory alert. The display of many wireless communication devices today includes a message indicator for each message it has received and stored in memory. This message indicator allows a quick view for the user of how many messages are in the wireless communication device and also allows the user to quickly pick a message to view. The display further can include a call receipt message indicating to the user a new call is being received and/or the source of the new call.

Today, wireless service providers are teaming up with content providers to provide content on wireless communication devices. The content providers benefit from such partnerships by being able to send content to a large number of potential consumers in a cost effective manner. The content, for example, can include weather, traffic, events, restaurants, shopping, services, sports, and the like. Adjunct content servers connected through the wireless communication system provide content information and other content services to device users that have their content configured according to personalized preferences, system generated information, and/or information generated directly from the wireless communication device.

Methods and systems have been developed in an attempt to satisfy the increasing demand for information, multimedia and other communication services on wireless communication devices. One of the most popular techniques of obtaining these services is through the Internet. The Internet is collection of over 25,000 computer networks connected through a communication backbone (NSFNET backbone) funded by the National Science Foundation (NSF) and is currently managed by Advanced Network System (ANS). A subscriber obtains an account with an organization's host computer (server) that is connected to the Internet through one or more networks. Traditionally, the subscriber is connected to the server through telephone lines using a personal computer (PC) and a modem. As use of the Internet becomes more popular, different methods of accessing the Internet have been developed. For example, users can access the Internet using a wireless communication device.

One drawback of sending content such as Internet content to wireless communication devices via various wireless communication systems today is the amount of channel space required to send the content information. Service providers want to offer the content services without impacting channel space for traditional message communication. Another drawback is the amount of memory required to store such information on the wireless communication device. Users desire portable access to such content without the loss of memory storage for the traditional message communications, which is typically the dominant purpose of the wireless communication device.

BRIEF DESCRIPTION OF THE DRAWINGS

The present invention will be described by way of exemplary embodiments, but not limitations, illustrated in the accompanying drawings in which like references denote similar elements, and in which.

DETAILED DESCRIPTION OF THE PREFERRED EMBODIMENT(S)

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but rather should be interpreted merely as a basis for the claims and as a representative basis for teaching one skilled in the art to variously employ the present invention in virtually any appropriately detailed structure. Further, the terms and phrases used herein are not intended to be limiting; but rather are intended to provide an understandable description of the invention.

The terms "a" or "an," as used herein, are defined as one or more than one. The term "plurality," as used herein, is defined as two or more. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically. The term "program," as used herein, is defined as a sequence of instructions designed for execution on a computer system. A program, or computer program, may include a subroutine, a function, a procedure, an object method, an object implementation, an executable application, an applet, a servlet, a source code, an object code, a shared library/dynamic load library and/or other sequence of instructions designed for execution on a computer system.

Figure 1:
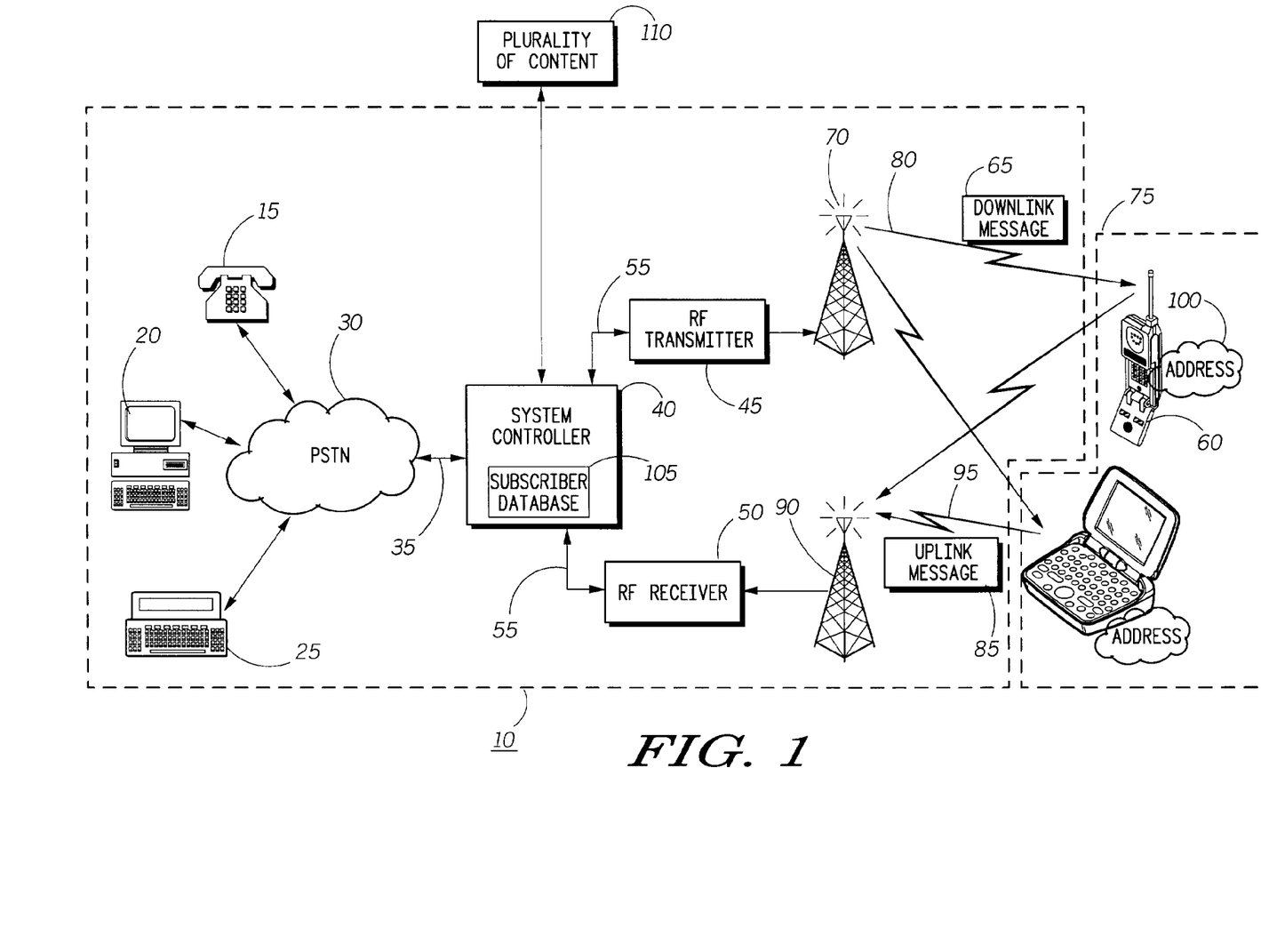
FIG. 1 is an electronic block diagram of a wireless communication system, in accordance with a preferred embodiment of the present invention.

Referring to FIG. 1, an electronic block diagram of a wireless communication system 10 is shown. The wireless communication system 10 includes a message input device for initiating messages into the wireless communication system 10. The message input device can be, for example, a telephone 15, a computer 20, or a desktop messaging unit 25, connected through a conventional public switched telephone network (PSTN) 30 through a plurality of telephone links 35 to a system controller 40. The telephone links 35, for example, can be a plurality of twisted wire pairs, a fiber optic cable, or a multiplexed trunk line.

The system controller 40 is coupled to and oversees the operation of at least one radio frequency (RF) transmitter 45 and at least one radio frequency (RF) receiver 50 through one or more communication links 55. The communication links 55 typically are twisted pair telephone wires, and additionally can include radio frequency (RF), microwave, or other communication links. The radio frequency transmitter 45 and the radio frequency receiver 50 typically are used with message store and forward stations that encode and decode inbound and outbound messages into formats that are compatible with landline message switched computers and personal radio addressing requirements, such as cellular messages, short messaging service, or paging protocols. The system controller 40 can also function to encode and decode wireless messages that are transmitted to or received by the radio frequency transmitter 45 or the radio frequency receiver 50. Telephony signals are typically transmitted to and received from the system controller 40 by telephone sets such as the telephone 15 or a wireless communication device 60. The system controller 40 encodes and schedules outbound messages such as a downlink message 65. The system controller 40 then transmits the encoded outbound messages through the radio frequency transmitter 45 via a transmit antenna 70 to one or more of a plurality of wireless communication devices 75 such as the wireless communication device 60 on at least one outbound radio frequency (RF) channel 80. The downlink message 65 can be, for example, a data message or a voice call. Similarly, the system controller 40 receives and decodes inbound messages such as an uplink message 85 received by the radio frequency receiver 50 via a receive antenna 90 on at least one inbound radio frequency (RF) channel 95 from one of the plurality of wireless communication devices 75. The uplink message 85 can be, for example, a data message, a reply to a data message, a voice call, or a reply to a voice call.

It will be appreciated by one of ordinary skill in the art that the wireless communication system 10, in accordance with the present invention, can function utilizing any wireless RF channel, for example, a one or two-way pager channel, a mobile cellular telephone channel, or a mobile radio channel. Similarly, it will be appreciated by one of ordinary skill in the art that the wireless communication system 10 can function utilizing other types of communication channels such as infrared channels and/or Bluetooth channels. In the following description, the term "wireless communication system" refers to any of the wireless communication systems mentioned above or an equivalent.

Similarly, it will be appreciated by one of ordinary skill in the art that each of the plurality of wireless communication devices 75, such as the wireless communication device 60, in accordance with the present invention, can be a mobile cellular telephone, a mobile radio data terminal, a mobile cellular telephone having an attached or integrated data terminal, or a two way pager, such as the "Pagewriter 2000X" manufactured by Motorola Inc. of Schaumburg, Ill. In the following description, the term "wireless communication device" refers to any of the devices mentioned above or an equivalent.

Each of the plurality of wireless communication devices 75 assigned for use in the wireless communication system 10 has an address or identity assigned thereto which is a unique selective call address in the wireless communication system 10. For example, the wireless communication device 60 assigned for use in the wireless communication system 10 has an address 100 assigned thereto which is a unique selective call address in the wireless communication system 10 for the wireless communication device 60. The address 100 enables the transmission of the downlink message 65 from the system controller 40 only to the wireless communication device 60 having the address 100, and identifies the messages and responses received at the system controller 40 from the wireless communication device 60 with the address 100. In one embodiment, each of the plurality of wireless communication devices 75 also has a pin number assigned thereto, the pin number being associated with a telephone number within the PSTN 30. A list of the assigned addresses and correlated telephone numbers for each of the plurality of wireless communication devices 75 is stored in the system controller 40 in the form of a subscriber database 105.

Preferably, and in accordance with the present invention, the wireless communication system 10 is coupled to and receives a plurality of content 110. As illustrated, the plurality of content 110 is preferably received and processed by the system controller 40. It will be appreciated by those of ordinary skill in the art, that alternatively, the PSTN 30 can receive the plurality of content 110 and send it to the system controller 40 for processing (not shown). The plurality of content 110 can include, for example, content associated with physical events such as sporting events, content associated with television or radio broadcasts, wireless content, Internet content, or an equivalent. Each of the plurality of content 110 can be separately designated within the wireless communications system 10, or alternatively can be grouped within one or more topics. The plurality of content 110, for example, can include separately designated content such as weather, traffic, events, restaurants, shopping, services, sports, and the like. Further, for example, a general topic can be the National Football League (NFL) and all events relating to the NFL such as a live NFL game via the Internet or a pay per view broadcasted NFL game can be grouped within the general topic.

Figure 2:
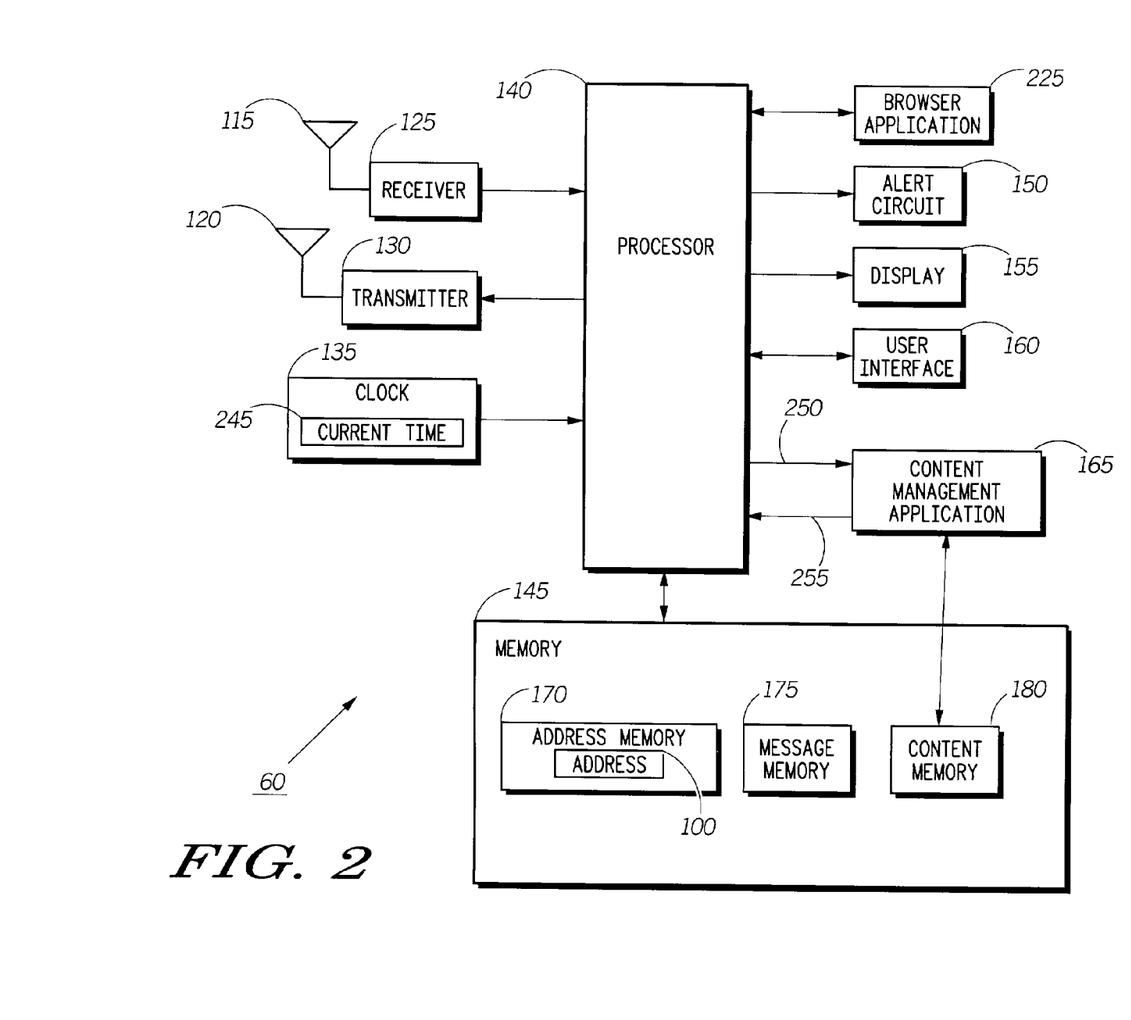
FIG. 2 is an electronic block diagram of a wireless communication device for use within the wireless communication system of FIG. 1, in accordance with a preferred embodiment of the present invention.

FIG. 2 is an electronic block diagram of a preferred embodiment of the wireless communication device 60 for use within the wireless communication system 10 of FIG. 1 in accordance with the present invention. It will be appreciated by one of ordinary skill in the art that the electronic block diagram of FIG. 2 is illustrative of each of the plurality of wireless communication devices 75 assigned for use in the wireless communication system 10.

Referring to FIG. 2, the wireless communication device 60 includes a first antenna 115, a second antenna 120, a receiver 125, a transmitter 130, a clock 135, a processor 140, a memory 145, an alert circuit 150, a display 155, a user interface 160, a browser application 225, and a content management application 165. It will be appreciated by one of ordinary skill in the art that the content management application 165 and the browser application 225 can be a software program or any other equivalent.

The first antenna 115 intercepts transmitted signals from the wireless communication system 10. The first antenna 115 is coupled to the receiver 125, which employs conventional demodulation techniques for receiving the communication signals transmitted by the wireless communication system 10 such as the downlink message 65 of FIG. 1.

Coupled to the receiver 125, is the processor 140 utilizing conventional signal-processing techniques for processing received messages. Preferably, the processor 140 is similar to the MC68328 micro-controller manufactured by Motorola, Inc. of Schaumburg, Ill. It will be appreciated by one of ordinary skill in the art that other similar processors can be utilized for the processor 140, and that additional processors of the same or alternative type can be utilized as required to handle the processing requirements of the processor 140.

The processor 140 decodes an address in the demodulated data of the received message, compares the decoded address with one or more addresses such as the address 100 stored in an address memory 170 of the memory 145; and when a match is detected, proceeds to process the remaining portion of the received message.

To perform the necessary functions of the wireless communication device 60, the processor 140 is coupled to the memory 145, which preferably includes a random access memory (RAM), a read-only memory (ROM), and an electrically erasable programmable read-only memory (EEPROM)(not shown). The memory 145 is comprised of the address memory 170, a message memory 175, and a content memory 180.

Figure 3:
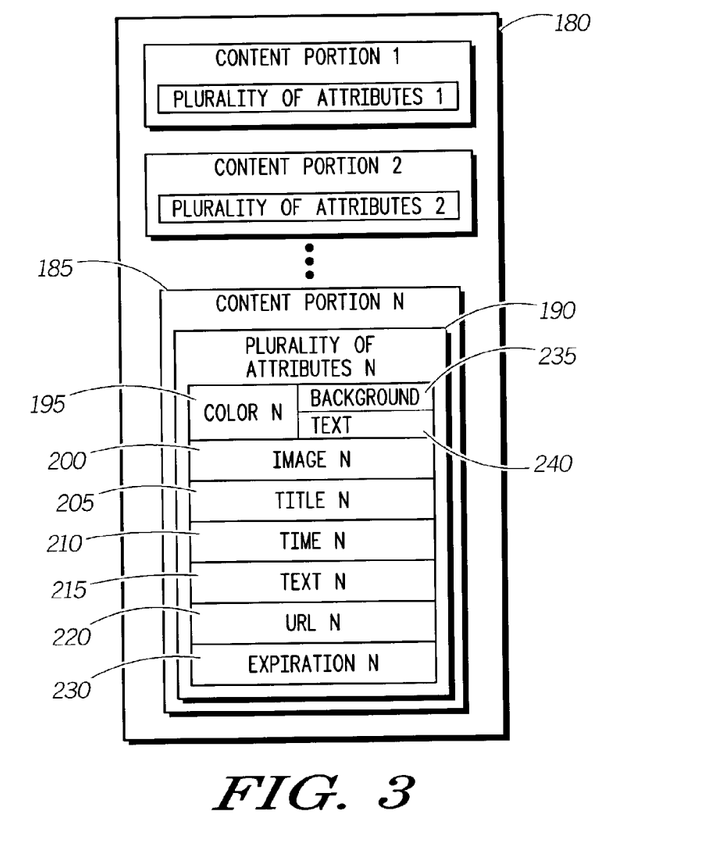
FIG. 3 is a block diagram of a content memory for use within the wireless communication device of FIG. 2, in accordance with a preferred embodiment of the present invention.

FIG. 3 illustrates further detail of the content memory 180 in accordance with a preferred embodiment of the present invention. As illustrated, the content memory 180 preferably stores one or more content portions 185 for one or more of the plurality of content 110 received from the wireless communication system 10. Each content portion 185 includes one or more attributes 190. The one or more attributes 190 can, for example, include a color element 195, an image element 200, a title attribute 205, a time attribute 210, and a text element 215. The time attribute 210 specifies the time for the related content with which the content portion 185 is associated. The title attribute 205 specifies the title text, which shall be displayed on the display 155 for the content portion 185. The title attribute 205 gives the user an idea of what category the subject is in, such as music, news, weather, and the like. When the user interface 160 permits, the title attribute 205 can have a different appearance on the display 155 than the text element 215 of the content portion 185.

The image element 200 specifies the image file to be displayed along with the content portion 185 on the display 155. The actual image file must be fetched once received from the wireless communication system 10 such as within a content message. The image retrieved for example can be in GIF (Graphic Interchange Format) or PNG (Portable Network Graphics) format or an equivalent. When no image element 200 is specified for the content portion 185, a default image can be used. The text element 215 contains the text description of the content. It acts as a teaser to the more detailed article specified by a Uniform Resource Locator (URL) attribute 220 if present.

The color element 195 allows the content provider to specify the background color and text color of the content portion text display area on the display 155. If the color element 195 doesn't exist, the background and text color of the text area preferably can be a default color. Preferably, if either of the attributes (text or background) is missing, the color element 195 is ignored by the content management application 165. In one embodiment, color values are specified in hexadecimal format as #RRGGBB, where RR=red value in hex, GG=the green value in hex, and BB=the blue value in hex. Preferably, the color element 195 includes a background color attribute 235 and a text color attribute 240. The background color attribute 235 preferably specifies the sRGB (a standard default color space for the Internet) color of the text display area background in the format #RRGGBB as previously described. The text attribute 240 specifies the sRGB color for the snack text in the format #RRGGBB as previously described.

In one embodiment, the one or more attributes 190 of the content portion 185 further includes the URL attribute 220. The URL attribute 220 allows the user to view more detailed information related to the content portion 185 using the browser application 225 or equivalent on the wireless communication device 60.

In one embodiment of the present invention, the one or more attributes 190 of the content portion 185 includes an expiration element 230. The expiration element 230 specifies the expiration time and date for the content portion 185. If no expiration element 230 is stored, the content portion 185 will not expire and will remain in the content memory 180 of the wireless communication device 60 until some other event causes it to be deleted (for example: the content memory becomes full). The clock 135 on the wireless communication device 60 can be the time base for the deletion. In an alternate embodiment, the time attribute 10, if present, can be used as an indication of when the content portion 185 is to be deleted.

Referring back to FIG. 2, once the processor 140 has processed a received message, it stores the decoded message in the message memory 175. It will be appreciated by one of ordinary skill in the art that the message memory 175, in accordance with the present invention, can be a group of memory locations in a data storage device or an equivalent.

Upon receipt and processing of a message, the processor 140 preferably generates a command signal to the alert circuit 150 as a notification that the message has been received and stored. The alert circuit 150 can include a speaker (not shown) with associated speaker drive circuitry capable of playing melodies and other audible alerts, a vibrator (not shown) with associated vibrator drive circuitry capable of producing a physical vibration, or one or more LEDs (not shown) with associated LED drive circuitry capable of producing a visual alert. It will be appreciated by one of ordinary skill in the art that other similar alerting means as well as any combination of the audible, vibratory, and visual alert outputs described can be used for the alert circuit 150.

Upon receipt of a message, the processor 140 preferably also generates a command signal to the display 155 to generate a visual notification of the receipt and storage of the message. When the display 155 receives the command signal from the processor 140 that the message has been received and stored in the message memory 175, a message indication is displayed. The message indication, for example can be the activation of one of a plurality of message icons on the display 155. The display 155 can be, for example, a liquid crystal display, a dot matrix display, or an equivalent.

The wireless communication device 60 preferably further includes the clock 135. The clock 135 provides timing for the processor 140. The clock 135 preferably includes a current time 245 for use in the operation of the wireless communication device 60 such as for use by the content management application 165. The clock 135 also provides a source for timing of feature enhancements such as active and inactive periods of operation or periods of alerting.

In a preferred embodiment, the wireless communication device 60 includes the content management application 165. The content management application 165 is programmed to process the one or more content portions 185 received by the receiver 125 and/or stored in the content memory 180, and to identify personalized content to be displayed to the user on the display 155. The wireless communication device 60 performs content management functions within the content management application 165 using a processor command 250 sent from the processor 140. The content management application 165 sends an application response 255 in reply to the processor command 250. The content management application 165 can be hard coded or programmed into the wireless communication device 60 during manufacturing, can be programmed over-the-air upon customer subscription, or can be a downloadable application. It will be appreciated by one of ordinary skill in the art that other programming methods can be utilized for programming the content management application 165 into the wireless communication device 60.

The content management application 165, in response to the processor command 250, preferably accesses the content memory 180 of the memory 145. The content management application 165 is programmed with a set of rules identifying the management of the one or more content portions 185 received by the receiver 125 and/or stored in the content memory 180. For example, the content management application 165 can identify the one or more content portions 185 to be displayed on the display 155. The content management application 165 sends the application response 255 to the processor 140 including the one or more content portions 185 and an associated plurality of attributes 190. The processor 140, in response to receipt of the application response 255 sends a command signal to the display 155 identifying the content portion 185 and the plurality of attributes 190 for displaying on the display 155. In a preferred embodiment, the content information is received in a manner that is non-obtrusive to the device user. The one or more content portions 185 is received by the receiver 125 and forwarded by the processor 140 to the content memory 180 for storage and for later processing by the content management application 165. The user preferably is not alerted upon the receipt of each message containing the one or more content portions 185.

The content management application 165 is programmed to handle incoming content portions and expired content portions. The content management application 165 can be programmed, for example, to check expiration times in conjunction with the receipt of an incoming content portion, expiration of the scroll timer, or other such events. Similarly, the content management application 165 can be programmed to update the display 155 with a newly received and stored content portion when a scroll timer expires. Consequently, the content management application 165 can consider other pending events prior to updating the display 155 in order to present a more pleasing experience to the user.

Figure 4:
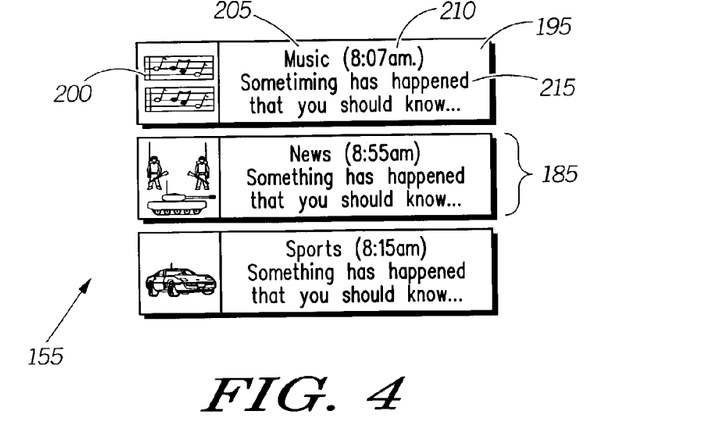
FIG. 4 illustrates one embodiment of a display for use within the wireless communication device of FIG. 2 in accordance with the present invention.

FIG. 4 illustrates an example of the display 155 including the one or more content portions 185. As illustrated, the title attribute 205 and the time attribute 210 are preferably displayed on the first line of each content portion area. If the total length of the title attribute 205 and the time attribute 210 is longer than the number of characters, which can be displayed on that line, it can be truncated and an indication that it has been truncated displayed at the end of the line. The text element 215 is displayed on the second and third lines of the content portion area. If the length of the text element 215 is longer than can be displayed on those two lines, it can be truncated and an indication that it has been truncated displayed at the end of the line. Each image element 200, for example, can be a 16-bit (or less) color image that is 55 pixels wide by 38 pixels high. If the image element 200 is larger than the available display space, it can be truncated to fit into the space. The image element 200 can either be centered, or upper left justified, or an equivalent.

Preferably, the user interface 160 is coupled to the processor 140, as shown in FIG. 2. The user interface 160 can be one or more buttons used to generate a button press, a series of button presses, a voice response from the device user, or some other similar method of manual response initiated by the device user of the wireless communication device 60. The processor 140, in response to the user interface 160, initiates the processor command 250 to the content management application 165. The content management application 165, in response to the processor command 250 can alter the displayed content portions and/or perform other actions on the one or more content portions. For example, pressing a button of the user interface 160 can cause all content portions to be updated and then the updated content portions displayed on the display 155. Similarly, pressing a button on the user interface 160 can cause all expired content portions to be deleted and all newly received content portions to be stored in the content memory 180. In one embodiment, the user interface 160 can be used to highlight one or more attributes of a content portion. Preferably, the user interface 160 is used to scroll between various displayed content portions, to select various displayed content portions, and/or to select the URL attribute 220 for a displayed content portion to access the content associated with the content portion.

The transmitter 130 is coupled to the processor 140 and is responsive to commands from the processor 140. When the transmitter 130 receives a command from the processor 140, the transmitter 130 sends a signal via the second antenna 120 to the wireless communication system 10. The signal, for example, can be the uplink message 85 as illustrated in FIG. 1.

In an alternative embodiment (not shown), the wireless communication device 60 includes one antenna performing the functionality of the first antenna 115 and the second antenna 120. Further, the wireless communication device 60 alternatively includes a transceiver circuit performing the functionality of the receiver 125 and the transmitter 130. It will be appreciated by one of ordinary skill in the art that other similar electronic block diagrams of the same or alternate type can be utilized for the wireless communication device 60 to handle the requirements of the wireless communication device 60.

Content information is preferably sent from the wireless communication system 10 to one or more of the plurality of wireless communication devices 75 using the extensible markup language (XML). XML is a universal format for structured documents and data on the World Wide Web. XML is a set of rules (i.e.: guidelines or conventions) for designing text formats for structuring data. XML makes use of tags (words bracketed by '<' and '>') and attributes (of the form name="value"). XML uses the tags only to delimit pieces of data, and leaves the interpretation of the data completely to the application that reads it.

Preferably, the content delivery mechanism uses the wireless application protocol (WAP) push method. This method allows content to be sent or "pushed" to devices by serverbased applications via a push proxy. Push functionality is especially relevant to real-time applications that send notifications to their users, such as messaging, stock price and traffic update alerts. Without push functionality, these types of applications would require the devices to poll application servers for new information or status. In wireless environments such polling activities would constitute inefficient and wasteful use of the resources of wireless communication systems. WAP's push functionality provides control over the lifetime of pushed messages, store & forward capabilities at the push proxy and control over the bearer's choice for delivery. Each pushed message contains a URL to the content associated with each of the one or more content portions 185. In a preferred embodiment, the wireless communication device 60 can fetch the content associated with each of the one or more content portions 185 when it receives a push message. One or more fetch actions may be required when the content portion 185 includes a URL to the content and a URL to the image associated with the content. Once the content portion has been fetched, it will be sent up to the content memory 180 for storage. Content portions that do not contain the required elements and attributes are preferably discarded.

Figure 5:
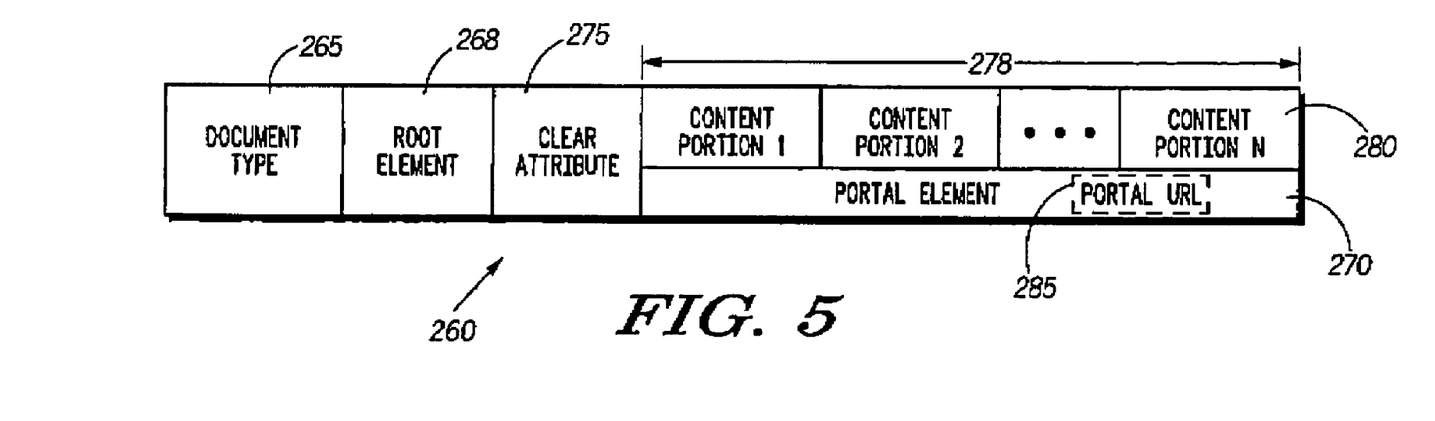
FIG. 5 illustrates a content message for communicating within the wireless communication system of FIG. 1 in accordance with a preferred embodiment of the present invention.

FIG. 5 illustrates a content message 260 for communicating content information. The content message 260 can be, for example, the downlink message 65 of FIG. 1. As illustrated in FIG. 5, the content message 260 preferably includes a document type 265, a root element 268, a clear attribute 275, and an information message 278. In accordance with the present invention, the information message 278 can be either a portal element 270 or one or more communicated content portions 280.

When the downlink message 65 sent from the wireless communication system 10 to one or more of the plurality of wireless communication devices 75 is the content message 260, the document type 265 preferably is set to indicate that the data to follow relates to one or more communicated content portions 280. For example, the document type 265 can be indicated by "text/x-motorola.sxl." Upon receipt of a message with the document type 265=text/x-motorola.sxl, the processor 140 sends the processor command 250 to the content management application 165.

The root element 268 is the top-level element in the XML document hierarchy. The root element contains all other elements. Each document can have only one root. All other elements are nested within it.

The portal element 270 indicates where the user can go to customize the one or more content portions 185 stored in the content memory 180. For example, the portal element 270 indicates where the user can go to customize the one or more communicated content portions 280 sent within the content message 260. The portal element 270 includes a portal URL 285 at which the user can access and update one or more preferences. The portal URL 285 is preferably stored in the memory 145 of the wireless communication device 60. When the wireless communication device 60 receives a new portal element 270, the new portal element 270 replaces the currently stored portal URL. It will be appreciated by those of ordinary skill in the art that the device user can access the portal URL 285 through the browser application 225 by initiating an input to the user interface 160. For example, the portal URL 285 can be assigned to a button, which, when pressed, displays that web page using the browser application 225. It will further be appreciated by those of ordinary skill in the art that the one or more preferences for content message receipt can be updated by a user at the portal URL 285 using the browser application 225 in response to an input from the user interface 160 of the wireless communication device 60.

The clear attribute 275 is used to flush the existing queue of stored content portions 185. When the clear attribute 275 is set to "yes" in the content message 260, the wireless communication device 60 deletes all existing (received) content portions from the content memory 180 prior to storing any new one or more communicated content portions 280. It will be appreciated by those of ordinary skill in the art that the new one or more communicated content portions 280 can be included in the content message 260 containing the clear attribute 275 set to "yes"; or alternatively can be included in a second content message communicated after the stored content portions have been deleted. When the clear attribute 275 is set to "no" or is not present in the content message 260, the one or more communicated content portions 280 of the content message 260 will be considered an incremental update.

Figure 6:
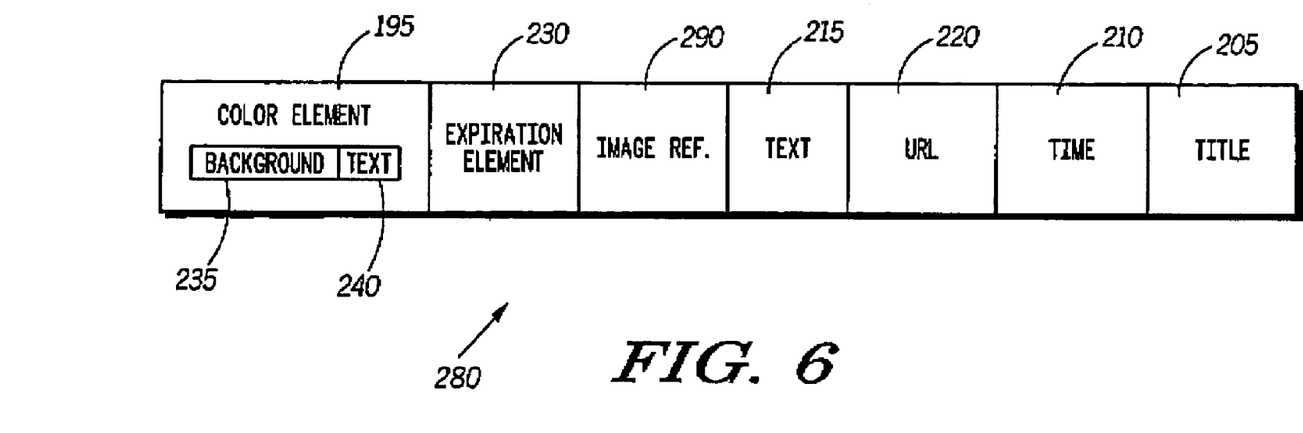
FIG. 6 illustrates a content portion communicated within the content message of FIG. 5 in accordance with a preferred embodiment of the present invention.

FIG. 6 illustrates the one or more communicated content portion 280 in further detail. As illustrated in FIG. 6, the communicated content portion 280 preferably includes one or more attributes including the color element 195 (including the background color 235 and the text color 240), the expiration element 230, an image reference attribute 290, the text element 215, the URL attribute 220, the time attribute 210, and the title attribute 205. The image reference attribute specifies the URL for the image data file. This data file can be retrieved once the content message 260 is received. The image URL is discarded once the image element 200 has been retrieved and stored in the content memory 180. The attributes included in the communicated content portion 280 are substantially equivalent to those described previously herein for FIG. 3.

One example of the data format of the content message 260 of FIGS. 5 and 6 is illustrated below:

```
<?xml version="1.0"? encoding="UTF-8" standalone="no"?>
<!DOCTYPE sxl SYSTEM "http://URI/xml/dtds/sxl.dtd">
<!-- a color using sRGB: #RRGGBB as Hex values -->
<!ENTITY % Color "CDATA">
<!ELEMENT SXL (PORTAL | SNACK+ )>
<!ATTLIST SXL
clear CDATA #IMPLIED
>
<!ELEMENT PORTAL EMPTY>
<!ATTLIST PORTAL
    href CDATA #REQUIRED
>
<!ELEMENT SNACK (COLOR?, EXP?, IMG, T)>
<!ATTLIST SNACK
    href CDATA #REQUIRED
    time CDATA #IMPLIED
    title CDATA #REQUIRED
    >
<!ELEMENT COLOR EMPTY>
<!ATTLIST COLOR
    bg %Color; #REQUIRED
    text %Color #REQUIRED
>
<!ELEMENT EXP EMPTY>
<!ATTLIST EXP
    time CDATA #REQUIRED
    >
<!ELEMENT IMG EMPTY>
<!ATTLIST IMG
    href CDATA #IMPLIED
>
<!ELEMENT T (#PCDATA)>
```

Figure 7:
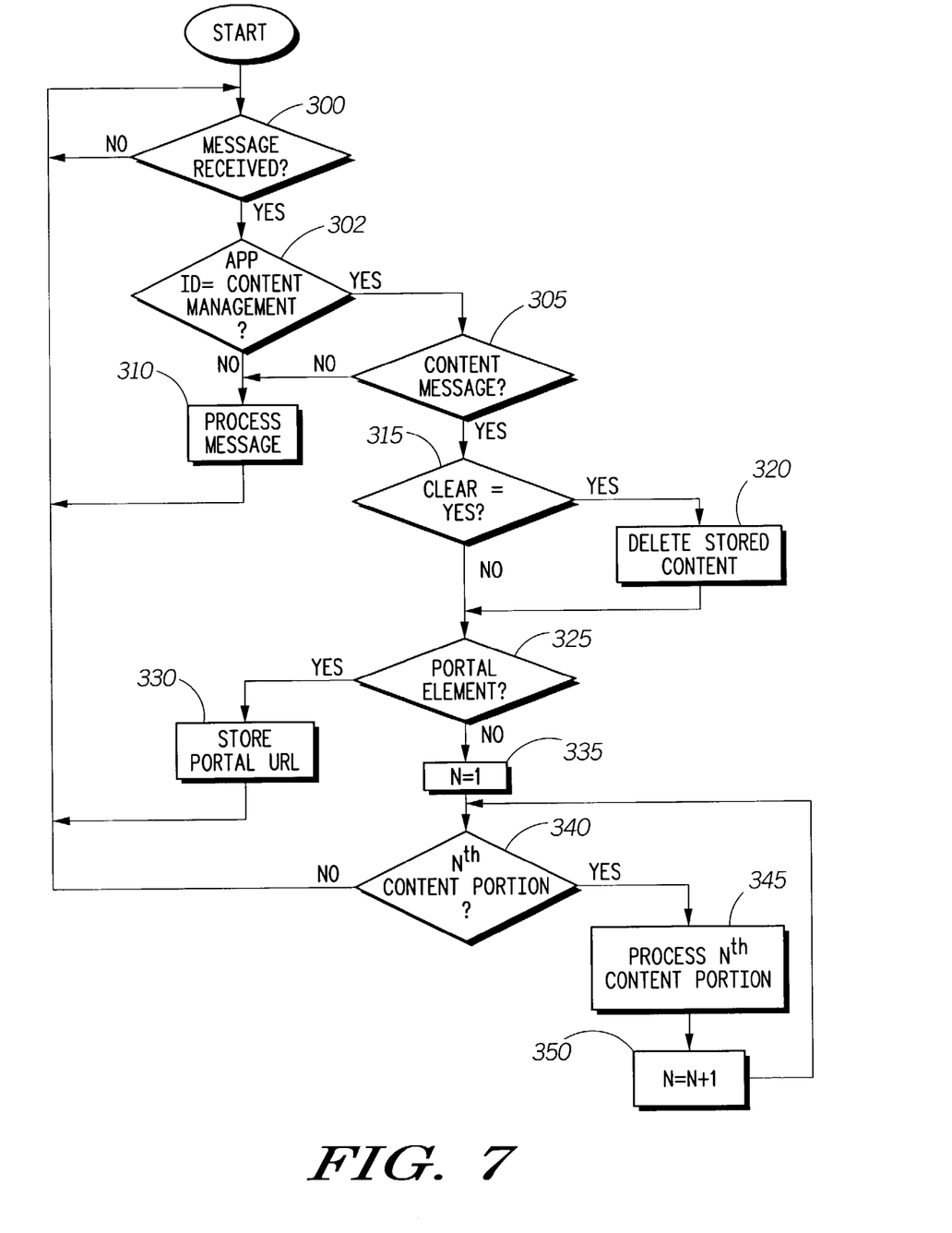
FIGS. 7 and 8 are flowcharts illustrating the operation of the wireless communication device of FIG. 2 in accordance with a preferred embodiment of the present invention.

FIG. 7 is a flowchart illustrating the operation of the wireless communication device 60 of FIG. 2 in accordance with a preferred embodiment of the present invention. Specifically, FIG. 7 illustrates the processing of a received content message 260 by the wireless communication device 60. The process begins with Step 300 wherein the wireless communication device 60 checks for a received message. The wireless communication device 60, for example, can receive the downlink message 65 from the wireless communication system 10 via the first antenna 115 coupled to the receiver 125. When no message has been received in Step 300, the process cycles back and periodically checks for a received message. Next, in Step 302, when a message has been received, the wireless communication device 60 queries whether the application identification (APP ID) in the WAP push is the APP ID designated for the content management application 165. Next, in Step 305, when the application identification is the APP ID designated for the content management application 165, the received message is pushed to the content management application 165 for further processing. Specifically, the content management application 165 of the wireless communication device 60 determines whether the received message is a content message 260. For example, the content management application 165 determines whether the received message includes the document type 265 set to indicate that the data to follow relates to one or more content communicated content portions 280. In Step 310, when the received message is not a content message 260 in Step 305 or when the application identification is not the APP ID designated for the content management application 165 in Step 302, the message is processed as a standard received message. For example, the message is stored in the message memory 175 of the memory 145 and the processor sends a command signal to the alert circuit 150 and a command signal to the display 155 to notify the user of the received message. The process then cycles back to Step 300 and periodically checks for receipt of a message.

Next in Step 315, when the received message is a content message 260, the content management application 165 of the wireless communication device 60 determines whether the content message 260 includes a clear attribute 275 set to "yes". It will be appreciated by those of ordinary skill in the art that the clear attribute 275 being set as a "yes" is an example for illustration purposes only, and that the clear attribute 275 can be set to any affirmative indication that the one or more content portions 185 should be deleted from the content memory 180. In Step 320, when the content message 260 includes the clear attribute 275 set to "yes", the wireless communication device 60 deletes the one or more content portions 185 stored in the content memory 180 of the memory 145. Next, in Step 325, when the one or more content portions 185 stored in the content memory 180 have been deleted (i.e. the content memory 180 is empty), or when the clear attribute 275 is set to "no" (or any other indication not to delete the one or more content portions 185 from the content memory 180) or not present in the content message 260, the content management application 165 determines whether the information message 278 of the content message 260 includes a portal element 270. In Step 330, when the information message 278 includes a portal element 270, the associated portal URL 285 is stored in the memory 145 for later access and use by the device user. The process then returns to Step 300 and periodically checks for received messages. In Step 335, when the information message 278 does not include a portal element 325, a counter is set to N=1. Next, in Step 340, the content management application 165 determines whether the information message 278 of the content message 260 includes an Nth content portion. When the Nth content portion is not included in the content message 260, the process cycles back to Step 300 and periodically checks for received messages. In Step 345, when the content message 260 includes the Nth content portion, the content management application 165 processes the Nth content portion. Next, in Step 350, the counter is incremented to N=N+1 and the process cycles back to Step 340 to check for the presence of the Nth content portion in the content message 260.

Figure 8:
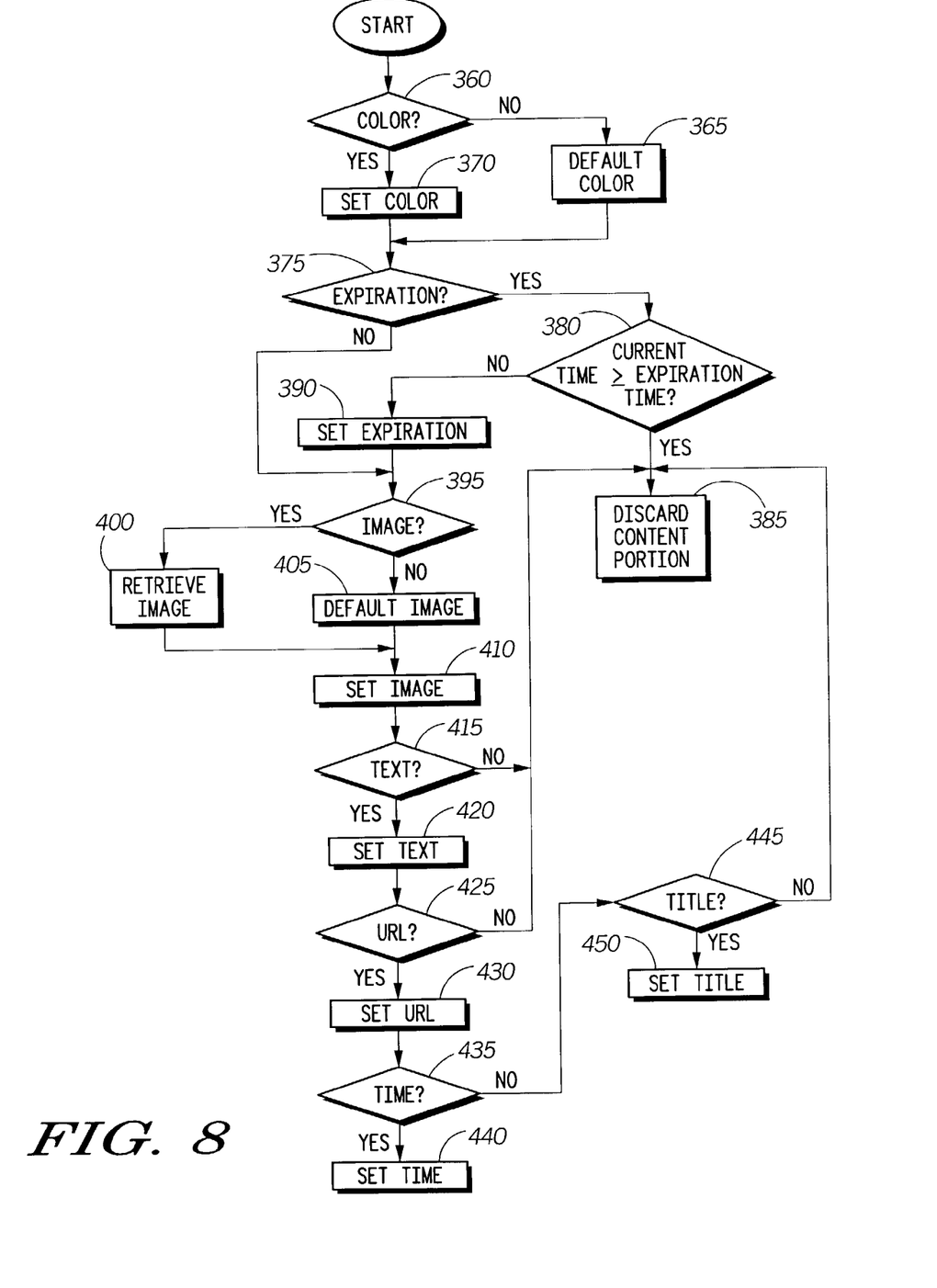

FIG. 8 is a flowchart illustrating further detail of the operation of the wireless communication device 60 of FIG. 2 in accordance with a preferred embodiment of the present invention. Specifically, FIG. 8 illustrates the processing of a communicated content portion 280 as in Step 345 of FIG. 7 by the content management application 165 of the wireless communication device 60. The process begins with Step 360 wherein the content management application 165 determines whether the content portion includes a color element 195. In Step 365, when no color element 165 is included, the background and text color of the text area to be displayed on the display 155 for the communicated content portion 280 is set to a default color. In Step 370, when a color element 165 is included in the communicated content portion 280, the background color and the text color of the text area to be displayed on the display 155 for the communicated content portion 280 is set to the background color and text color of the background color attribute 235 and the text color attribute 240 preferably sent with the color element 195. Next, in Step 375, the content management application 165 determines whether an expiration element 230 is included in the communicated content portion 280. In Step 380, when an expiration element 230 is included in the communicated content portion 280, the content management application 165 compares the current time 245 with the expiration time of the expiration element 230. In Step 385, when the current time 245 is at least equal to (i.e., greater than or equal to) the expiration time, the communicated content portion 280 received within the content message 260 is discarded. In Step 390, when the current time 245 is less than the expiration time, the expiration time is set and stored within the content memory location 180 for the communicated content portion 280. In Step 395, when no expiration element 230 is included within the communicated content portion 280 in Step 375, or when the expiration time has been stored in Step 390, the content management application 165 determines whether the communicated content portion 280 includes an image element 200. In Step 400, when the image element 200 is included, the image file is retrieved. For example, the content management application 165 informs the processor 140 to retrieve the image from the specified URL within the image element 200. In Step 405, when no image element 200 is included within the communicated content portion 280, a default image is identified for the communicated content portion 280. Next in Step 410, the image for the communicated content portion 280 is stored in the content memory 180. Next, in Step 415, the content management application 165 determines whether the communicated content portion 280 includes a text element 215. When no text element 214 is present, the process cycles to Step 385 and the communicated content portion 280 received within the content message 260 is discarded. In Step 420, when the text element 215 is included, the text description of the content contained within the text element 215 is stored in the content memory 180. Next, in Step 425, the content management application 165 determines whether the communicated content portion 280 includes a URL attribute 220. When no URL attribute 220 is present, the process cycles to Step 385 and the communicated content portion 280 received within the content message 260 is discarded. Next, in Step 430, when the URL attribute 220 is included, the URL of the content associated with the communicated content portion 180 is stored in the content memory 180. The user can later retrieve the content associated with the communicated content portion 180 as desired using the stored URL. Next, in Step 435, the content management application 165 determines whether the time attribute 210 is included within the communicated content portion 280. In Step 440, when the time attribute 210 is included, the time for the communicated content portion 280 is stored within the content memory 180. Next, in Step 445, when no time attribute is present in Step 435, the content management application 165 determines whether a title attribute 205 is present in the communicated content portion 280. When the title attribute is present, the title text is stored in the content memory 180 in Step 450. When no title attribute 205 is present, the process cycles to Step 385 and the communicated content portion 280 received within the content message 260 is discarded.

The present invention as described herein provides a communication system and method for communication of content. Although the invention has been described in terms of preferred embodiments, it will be obvious to those skilled in the art that various alterations and modifications can be made without departing from the invention. Accordingly, it is intended that all such alterations and modifications be considered as within the spirit and scope of the invention as defined by the appended claims.

What is claimed is:

1. A wireless communication device for acquiring and managing content transmitted from a wireless communication system, the wireless communication device comprising:
   a memory for storing content portions;
   a receiver for receiving a content message transmitted from the wireless communication system, wherein the content message includes:
   a first set of one or more content portions, and
      a clear attribute, wherein the clear attribute indicates whether a second set of one or more content portions should be deleted from the memory, the second set of content portions having been stored in the memory prior to receipt of the content message;
   a processor coupled to the receiver and the memory for processing the content message; and
   a content management application executable by the processor, wherein the content management application, when executed, causes the processor to delete the second set of content portions from the memory in the event that the clear attribute indicates that the second set of content portions should be deleted.

2. The wireless communication device as recited in claim 1, wherein the content management application, when executed, further causes the processor to store the first set of content portions in the memory after deleting the second set of content portions from the memory.

3. The wireless communication device as recited in claim 1, wherein the content management application, when executed, further causes the processor to delete the first set of content portions responsive to receipt of a third set of one or more content portions.

4. The wireless communication device as recited in claim 1, wherein the content message further includes a portal element including a portal URL, the wireless communication device further comprising:
   a user interface, coupled to the processor, for receiving inputs from a user of the wireless communication device; and
   a browser application executable by the processor, wherein the browser application, when executed, causes the processor to access the portal URL and, while thereat, updating one or more preferences for content receipt in response to one or more inputs from the user interface.

5. The wireless communication device as recited in claim 1, wherein the content management application, when executed, further causes the processor to process at least one content portion of the first set of content portions.

6. The wireless communication device as recited in claim 5, further comprising:
   a display coupled to the processor for displaying the at least one content portion.

7. The wireless communication device as recited in claim 6, wherein the at least one content portion includes a color element, and wherein the content management application, when executed, further causes the processor to set a background color and a text color of a text area to be used for displaying the at least one content portion on the display.

8. The wireless communication device as recited in claim 5, wherein at least one content portion of the first set of content portions includes an expiration element having an expiration time, and wherein the content management application, when executed, further causes the processor to compare a current time to the expiration time, and to discard the at least one content portion when the current time is at least equal to the expiration time.

9. The wireless communication device as recited in claim 5, wherein at least one content portion of the first set of content portions includes an image reference attribute specifying a predetermined URL, and further wherein the content management application, when executed, further causes the processor to retrieve an image from the predetermined URL and to store the image in the memory as part of the at least one content portion.

10. The wireless communication device as recited in claim 5, wherein at least one content portion of the first set of content portions includes a text element comprising a text description of the content, and wherein the content management application, when executed, further causes the processor to store the text description of the content in the memory as part of the at least one content portion.

11. The wireless communication device as recited in claim 5, wherein at least one content portion of the first set of content portions includes a URL attribute comprising a URL of content associated with the at least one content portion, and wherein the content management application, when executed, further causes the processor to store the URL in the memory as part of the at least one content portion, the wireless communication device further comprising:
   a user interface, coupled to the processor, for receiving inputs from a user of the wireless communication device; and
   a browser application executable by the processor, wherein the browser application, when executed, causes the processor to retrieve the content associated with the at least one content portion using the URL in response to one or more inputs from the user interface.

12. The wireless communication device as recited in claim 5, wherein at least one content portion of the first set of content portions includes a time attribute comprising a time associated with the at least one content portion, and wherein the content management application, when executed, further causes the processor to store the title attribute in the memory as part of the at least one content portion.

13. The wireless communication device as recited in claim 5, wherein at least one content portion of the first set of content portions includes a title attribute comprising title text for the at least one content portion, and wherein the content management application, when executed, further causes the processor to store the title attribute in the memory as part of the at least one content portion.

14. A method for a wireless communication device to acquire and manage content transmitted from a wireless communication system, the method comprising:
   receiving a content message transmitted from the wireless communication system wherein the content message includes:
      a first set of one or more content portions, and
      a clear attribute, wherein the clean attribute indicates whether a second set of one or more content portions should be deleted from a memory of the wireless communication device, the second set of content portions having been stored in the memory prior to receipt of the content message, and
   deleting the second set of content portions from the memory in the event that the clear attribute indicates that the second set of content portions should be deleted.

15. The method of claim 14, further comprising:
   storing the first set of content portions in the memory after the deleting step.

16. The method of claim 14, wherein the content message further includes a portal element including a portal URL, the method further comprising:
   storing the portal URL in the memory;
   accessing the portal URL though a browser application of the wireless communication device in response to an input from a user interface of the wireless communication device; and
   updating one or more preferences for content receipt through the browser application in response to another input from the user interface while accessing the portal URL.

17. The method of claim 15, further comprising:
   processing the first set of content portions through use of a content management application.

18. The method of claim 17, further comprising:
   displaying at least one content portion of the first set of content portions on a display of the wireless communication device.

19. The method of claim 18, wherein at least one content portion of the first set of content portions includes a color element, and further wherein the processing step comprises:
   setting a background color and a text color of a text area to be used for displaying the at least one content portion on the display.

20. The method of claim 17, wherein at least one content portion of the first set of content portions includes an expiration element having an expiration time, and further wherein the processing step comprises:
   comparing a current time to the expiration time, and
   discarding the at least one content portion when the current time is at least equal to the expiration time.

21. The method of claim 17, wherein at least one content portion of the first set of content portions includes an image reference attribute specifying a predetermined URL, and wherein the processing step comprises:
   retrieving an image from the predetermined URL; and
   storing the image in the memory as part of the at least one content portion.

22. The method of claim 17, wherein at least one content portion of the first set of content portions includes a text element comprising a text description of the content, wherein the processing step comprises:
   storing the text description of the content in the memory as part of the at least one content portion.

23. The method of claim 17, wherein at least one content portion of the first set of content portions includes a URL attribute comprising a URL of content associated with the at least one content portion, wherein the processing step comprises:
   storing the URL in the memory as part of the at least one content portion, and
   retrieving the content associated with the at least one content portion through a browser application using the URL in response to an input from a user interface.

24. The method of claim 17, wherein at least one content portion of the first set of content portions includes a time attribute comprising a time associated with the at least one content portion, wherein the processing step comprises:
   storing the time attribute in the memory as part of the at least one content portion.

25. The method of claim 17, wherein at least one content portion of the first set of content portions includes a title attribute comprising title text for the at least one content portion, wherein the processing step comprises:
   storing the title attribute in the memory as part of the at least one content portion.

26. A method for supplying content to a wireless communication device in a wireless communication system, the method comprising:
   transmitting a content message to produce a transmitted content message, wherein the content message includes:
      a first set of one or more content portions, and
      a clear attribute, e clear attribute indicates whether a second set of one or more content portions should be deleted from a memory of the wireless communication device, the second set of content portions having been stored in the memory prior to transmission of the content message;
   receiving the transmitted content message; and
   deleting the second set of content portions from the memory in the event that the clear attribute indicates that the second set of content portions should be deleted.

* * * * *